United States Patent
Beall et al.

(10) Patent No.: US 10,000,424 B2
(45) Date of Patent: Jun. 19, 2018

(54) FAST FIRING METHOD FOR CERAMICS

(71) Applicant: CORNING INCORPORATED, Corning, NY (US)

(72) Inventors: Douglas Munroe Beall, Painted Post, NY (US); David Jack Bronfenbrenner, Painted Post, NY (US); Margaret Kathleen Faber, Corning, NY (US); Sriram Rangarajan Iyer, Painted Post, NY (US); Patrick David Tepesch, Corning, NY (US); Douglas Richard Wing, Corning, NY (US)

(73) Assignee: Corning Incorporated, Corning, NY (US)

( * ) Notice: Subject to any disclaimer, the term of this patent is extended or adjusted under 35 U.S.C. 154(b) by 916 days.

(21) Appl. No.: 14/196,163

(22) Filed: Mar. 4, 2014

(65) Prior Publication Data

US 2014/0252695 A1  Sep. 11, 2014

Related U.S. Application Data

(60) Provisional application No. 61/775,027, filed on Mar. 8, 2013.

(51) Int. Cl.
*C04B 38/00* (2006.01)
*C04B 35/195* (2006.01)
*C04B 111/34* (2006.01)

(52) U.S. Cl.
CPC ........ *C04B 38/0006* (2013.01); *C04B 35/195* (2013.01); *C04B 38/0038* (2013.01);
(Continued)

(58) Field of Classification Search
CPC ............ C04B 38/0006; C04B 38/0038; C04B 35/195; C04B 2235/9607;
(Continued)

(56) References Cited

U.S. PATENT DOCUMENTS 6,027,684 A    2/2000  Gheorghiu et al.
6,099,793 A *  8/2000  Dull ...................... C04B 35/195
                                                            264/630
(Continued)

FOREIGN PATENT DOCUMENTS

CN    103517885    1/2014
EP    2030957      3/2009
(Continued)

OTHER PUBLICATIONS

Patent Cooperation Treaty International Notification of Transmittal of the International Search Report and the Written Opinion of the International Searching Authority, international application No. PCT/US2014/020202; dated May 15, 2014, 10 pages.
(Continued)

*Primary Examiner* — Nahida Sultana
(74) *Attorney, Agent, or Firm* — Joseph M. Homa

(57) ABSTRACT

A method for firing a green honeycomb ceramic body in a kiln may include heating the green honeycomb ceramic body in four stages. The first stage may include heating the green honeycomb ceramic body from room temperature to a first temperature that at a first heating rate that is greater than or equal to about 75° C./hr. The second stage may include heating the green honeycomb ceramic body from the first temperature to a second temperature at a second heating rate that is less than or equal to the first heating rate. The third stage may include heating the green honeycomb ceramic body from the second temperature to a hold temperature at a third heating rate that is less than or equal to the first
(Continued)

heating rate. The fourth stage may include holding the green honeycomb ceramic body at the hold temperature to remove residual carbon.

35 Claims, 3 Drawing Sheets

(52) U.S. Cl.
CPC . *C04B 2111/343* (2013.01); *C04B 2235/6562* (2013.01); *C04B 2235/6567* (2013.01); *C04B 2235/6584* (2013.01); *C04B 2235/6588* (2013.01); *C04B 2235/9607* (2013.01)

(58) Field of Classification Search
CPC ....... C04B 2111/343; C04B 2235/6584; C04B 2235/6567; C04B 2235/6588; C04B 2235/6562
USPC ................................. 264/610, 630–631, 676
See application file for complete search history.

(56) References Cited

U.S. PATENT DOCUMENTS

| | | | |
|---|---|---|---|
| 6,225,733 | B1 | 5/2001 | Gadkaree et al. ............. 313/352 |
| 6,287,509 | B1 | 9/2001 | Gheorghiu |
| 6,395,206 | B1 | 5/2002 | Apte et al. |
| 6,541,407 | B2 | 4/2003 | Beall et al. |
| 7,914,874 | B2 | 3/2011 | Henry et al. |
| 7,976,768 | B2 | 7/2011 | Brady et al. |
| 8,444,737 | B2 | 5/2013 | Iyer |
| 8,454,887 | B2 | 6/2013 | Likitivanichkul |
| 2003/0165662 | A1* | 9/2003 | Suwabe ............... B01D 46/244 428/116 |
| 2005/0014104 | A1* | 1/2005 | Kurashima ............. C01B 3/384 432/28 |
| 2006/0089525 | A1 | 4/2006 | Coates et al. ................. 502/150 |
| 2007/0006561 | A1 | 1/2007 | Brady et al. ..................... 55/523 |
| 2007/0186471 | A1* | 8/2007 | Kurashima ............. B01J 8/062 48/61 |
| 2007/0245702 | A1* | 10/2007 | Kawata ............. B01D 39/2093 55/523 |
| 2007/0254798 | A1 | 11/2007 | Addiego et al. .............. 501/119 |
| 2007/0265161 | A1 | 11/2007 | Gadkaree et al. ............ 502/417 |
| 2008/0051554 | A1 | 2/2008 | Coates et al. ................. 528/405 |
| 2009/0200712 | A1* | 8/2009 | Hayashi ................ B28B 11/241 264/630 |
| 2009/0298667 | A1 | 12/2009 | Addiego et al. ................. 501/39 |
| 2009/0298670 | A1 | 12/2009 | Murtagh et al. |
| 2010/0052197 | A1* | 3/2010 | Deneka ................. B28B 11/243 264/40.4 |
| 2010/0218472 | A1* | 9/2010 | Iyer ....................... C04B 35/195 55/523 |
| 2010/0298113 | A1* | 11/2010 | Barthe ................ C04B 20/1062 501/80 |
| 2011/0121493 | A1* | 5/2011 | Saijo ....................... C04B 35/64 264/434 |
| 2013/0269303 | A1 | 10/2013 | Uoe et al. |
| 2014/0014500 | A1* | 1/2014 | Tomai ..................... C04B 35/01 204/192.15 |
| 2014/0252695 | A1 | 9/2014 | Beall et al. |

FOREIGN PATENT DOCUMENTS

| | | |
|---|---|---|
| JP | 2002160976 A | 6/2002 |
| JP | 2004292292 A | 10/2004 |
| JP | 2010083739 A | 4/2010 |
| WO | 2004/011124 | 2/2004 |
| WO | 2006/130759 | 12/2006 |
| WO | 2012/057142 | 5/2012 |
| WO | 2012/074944 | 6/2012 |
| WO | 2014/138015 | 9/2014 |

OTHER PUBLICATIONS

Patent Cooperation Treaty International Notification of Transmittal of the International Search Report and the Written Opinion of the International Searching Authority, international application No. PCT/US2014/047720; dated Nov. 10, 2014, 9 pages.
Patent Cooperation Treaty International Notification of Transmittal of the International Search Report and the Written Opinion of the International Searching Authority, international application No. PCT/US2014/047713; dated Nov. 27, 2014, 11 pages.
CN201480025700.4 First Office Action dated Nov. 7, 2016, China Patent Office.
CN201480053142.2 First Office Action dated Dec. 5, 2016, China Patent Office.
CN201480053173.8 First Office Action dated Nov. 21, 2016, China Patent Office.
JP2015561527 Office Action dated Apr. 4, 2017, Japan Patent Office.

* cited by examiner

FAST FIRING METHOD FOR CERAMICS

CROSS-REFERENCE TO RELATED APPLICATIONS

This application claims the benefit of priority under 35 U.S.C. § 119 of U.S. Provisional Application Ser. No. 61/775,027 filed on Mar. 8, 2013 the content of which is relied upon and incorporated herein by reference in its entirety.

BACKGROUND

Field

The present disclosure generally relates to firing green ceramic bodies and, more specifically, to firing cordierite green ceramic bodies.

Technical Background

Ceramic filters, particularly large frontal area filters, include organic raw materials that should be removed in the firing process. Such organic materials may be contained in, for example, binders (Methocel, polyvinyl alcohol, etc.), lubricants, dispersant, pore formers (starch, graphite, and other polymers). These materials may be burned out in the presence of oxygen at temperatures above their flash points. Some of these materials are also removed as volatile organic compounds (VOC) that are burned in a kiln and/or in an after treatment apparatus, such as a thermal oxidizer. The decomposition and/or oxidation of these materials usually release heat and often influence shrinkage or growth of the material, which may cause stresses and ultimately lead to cracking.

Conventional firing processes for large or heavy duty ceramic bodies rely on firing cycles with slow heating rates, such as 4° C./hr to 8° C./hr, when heating to a temperature below 600° C. These low heating rates allow the raw organic raw materials to be removed gradually and completely, thereby reducing the stress in the ceramic material. However, firing cycles are prolonged by using these low heating rates, as it may take up to 130 hours to heat the green ceramic body to 600° C., and, as a result, the entire firing cycle may take from 140 hours to 198 hours.

Accordingly, a need exists for a firing cycle with increased heating rates, particularly heating rates up to 600° C. that does not cause cracking in the ceramic body.

SUMMARY

According to one embodiment a method is described for firing a green honeycomb ceramic body in a kiln that may lower incidence of cracking in the ceramic body. The method may include heating the green honeycomb ceramic body in four stages. The first stage may include heating the green honeycomb ceramic body from room temperature to a first temperature that is from about 250° C. to about 650° C. at a first heating rate that from about 75° C./hr to about 125°/hr. The second stage may include heating the green honeycomb ceramic body from the first temperature to a second temperature that is from about 650° C. to about 950° C. at a second heating rate that is less than or equal to the first heating rate. The third stage may include heating the green honeycomb ceramic body from the second temperature to a hold temperature that is greater than the second temperature at a third heating rate that is less than or equal to the first heating rate. The fourth stage may include holding the green honeycomb ceramic body at the hold temperature to remove residual carbon.

In another embodiment, a second method for firing a green honeycomb ceramic body in a kiln is described. This embodiment may also include heating the green honeycomb ceramic body in four stages. The first stage may include heating the green honeycomb ceramic body from room temperature to a first temperature of from about 375° C. to about 500° C. at a first heating rate that is from about 100° C./hr to about 125° C./hr. The second stage may include heating the green honeycomb ceramic body to a second temperature of from about 750° C. to about 800° C. at a second heating rate that is from about 20° C./hr to about 75° C./hr. The third stage may include heating the green honeycomb ceramic body to a hold temperature of from about 950° C. to about 1100° C. at a third heating rate that is less than or equal to the second heating rate. The fourth stage may include holding the green honeycomb ceramic body at the hold temperature to remove residual carbon.

In each of the embodiments described above, oxygen levels in the kiln may be controlled to improve operation of the firing cycle. In embodiments, the amount of oxygen present in the kiln may be at ambient levels or higher. In other embodiments, the amount of oxygen present in the kiln may be below ambient levels. In each of the embodiments described above, steam may be introduced into the kiln during firing. In embodiments, the amount of steam introduced in the kiln may be up to 45% by volume in various stages of the firing process. In other embodiments no steam may be introduced into the kiln during various stages in the firing process.

Additional features and advantages of this disclosure will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
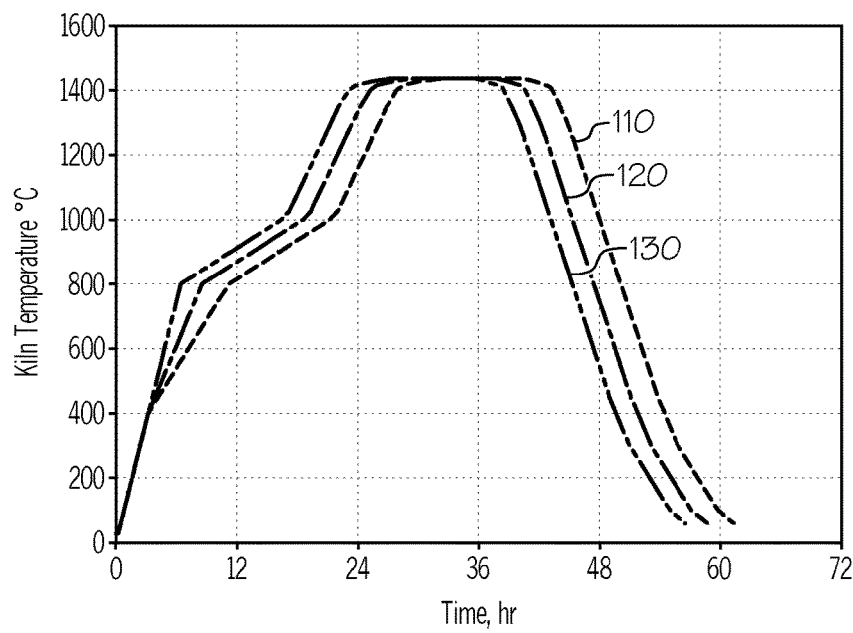
FIG. 1 is a graph showing heating rates in four stages for different sized ceramic bodies according to embodiments of the present disclosure.

Reference will now be made in detail to embodiments of firing cycles for firing green honeycomb ceramic bodies. In accordance with embodiments, a method of firing green honeycomb ceramic bodies includes heating the green honeycomb ceramic body in a kiln in four stages. In the first stage the green honeycomb ceramic body may be heated from room temperature to a first temperature at a first heating rate. In the second stage the green honeycomb ceramic body may be heated from the first temperature to a second temperature at a second heating rate. In the third stage the green honeycomb ceramic body may be heated from the second temperature to a third temperature at a third heating rate. In the fourth stage the green honeycomb ceramic body may be held at a constant temperature for an amount of time sufficient to remove residual carbon from the green honeycomb ceramic body. The first, second, and third heating rates may be the same or different. In embodiments, the first, second, and third heating rates may vary depending on the size of the ceramic body that is being heated, the amount of oxygen present in the kiln, and the amount of steam present in the kiln.

In embodiments, the cordierite of the ceramic body may be a cordierite-type phase approximating the stoichiometry $Mg_2Al_4Si_5O_{18}$ and having a coefficient of thermal expansion (25° C.-800° C.) of greater than $4\times10^{-7}/°$ C. and less than $13\times10^{-7}/°$ C. and a permeability and a pore size distribution which satisfy the relation 2.108 (permeability)+18.511 (total pore volume)+0.1863 (percentage of total pore volume comprised of pores between 4 and 40 micrometers)>24.6, as described, for example, in U.S. Pat. No. 6,541,407, which is incorporated herein by reference in its entirety. However, it should be understood that embodiments of the method disclosed herein may be used to fire any ceramic material.

In embodiments, the cordierite composition may have a super addition organic load from about 5% to about 50% or even from about 5% to about 30%. In some embodiments, the cordierite composition may have a super addition organic load from about 5% to about 15%, or even from about 7% to about 12% by weight. In other embodiments, the cordierite composition may have a super addition organic load from about 9% to about 10% by weight. In embodiments, the composition may include one or more of talc, clay, or graphite, or combinations thereof. In some embodiments, the composition may include talc from about 15% by weight to about 50% by weight of the composition. In some embodiments, the composition may include clay from about 10% by weight to about 30% by weight of the composition. In some embodiments, the composition may include graphite up to about 20% as a super-addition to the composition. The porosity of the formed ceramic body is not particularly limited. In embodiments, the porosity of the formed ceramic body may be from about 40% to about 60%, or even from about 45% to about 55%. In embodiments, the porosity of the formed ceramic body may be greater than about 50%, or even greater than about 55%.

First Stage

In embodiments, the first stage of the firing method may include heating a green honeycomb ceramic body from room temperature to from about 250° C. to about 650° C., such as from about 300° C. to about 600° C., from about 350° C. to about 550° C., from about 375° C. to about 500° C., or about 400° C. It should be understood that, as used herein, room temperature is not particularly limited and may include any ambient temperature of the ceramic body and/or kiln prior to commencement of the first stage of the firing method.

The heating rate used in the first stage may be sufficiently high to avoid cracking of the honeycomb ceramic body. In embodiments, the heating rate used in the first stage may be greater than or equal to about 75° C./hr. For example, in some embodiments the heating rate used in the first stage may be greater than or equal to about 100° C./hr. In embodiments, the first heating rate used in the first stage may be less than or equal to about 125° C./hr or even less than or equal to about 80° C./hr. In embodiments, the heating rate in the first stage may be about 75° C./hr, about 100° C./hr, or about 125° C./hr.

Figure 2:
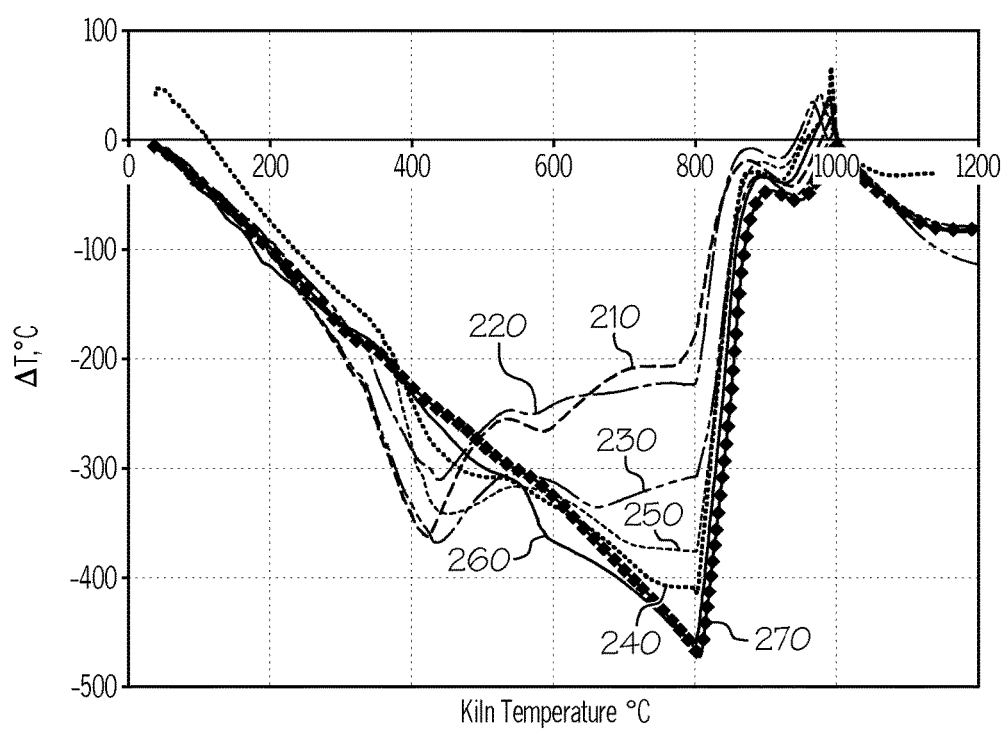
FIG. 2 is a graph showing temperature differences between the outer surface and the core of different sized ceramic bodies at various heating rates according to embodiments of the present disclosure.

The heating rate in the first stage may depend on the size of the honeycomb ceramic body that is being fired. For example, small-sized honeycomb ceramic bodies may be heated at high heating rates, while larger honeycomb ceramic bodies may be heated at lower heating rates. According to embodiments, using relatively high first stage heating rates may promote crack-free firing. Ramp rates in the first stage may be very high in comparison to known firing methods, such as the heating rates mentioned above. These higher heating rates differ from conventional understanding, where such high heating rates may be expected to cause cracking due to increased thermal gradients. Evidence of the high thermal gradients is seen in FIG. 2. Also as seen from the stress analysis results, these higher heating rates do not cause high stresses. Without being bound to any specific theory, such high thermal gradients may be reached without cracking because the high heating rates in combination with low oxygen access (either through low $O_2$ or reduced reaction time) may suppress binder and poreformer reactions that could lead to shrinkage. Therefore, the impact of high thermal gradients may be minimized due to low differential shrinkage. Additionally, the high heating rates may also promote uniform reactions through green bodies. At lower heating rates, green bodies may show high oxygen reaction pathways for the skin portion and low oxygen reaction pathways for the core portions. This may also contribute to low differential shrinkage within the green body during the first stage. Even if cracking is avoided in the first stage, this does not eliminate susceptibility to cracking in subsequent stages. Subsequent stages may need to be managed through more conventional means, such as different heating rates, $O_2$ level control, and steam control. Further, the size of the honeycomb ceramic body that is being fired may be taken into account to help control cracking and to modify heating rates.

FIG. 2 shows a temperature difference between the surface of a honeycomb ceramic body and the core of a honeycomb ceramic body ($\Delta T$) during heating of the kiln. In FIG. 2, $\Delta T$ for variously sized honeycomb ceramic bodies at various heating rates are measured. Each of the plots in FIG. 2 heat the ceramic bodies at 125° C./hr in the first stage, but various heating rates are used in the second stage. Plot 210 in FIG. 2 represents a honeycomb ceramic body having a 13 inch diameter and a 17 inch length that is heated at a heating rate of 50° C./hr in the second stage. Plots 220 and 230 represent honeycomb ceramic bodies heated at a heating rate of 75° C./hr in the second stage. Plot 220 represents a honeycomb ceramic body having a diameter of 13 inches and a length of 12 inches, and plot 230 represents a honeycomb ceramic body having a diameter of 13 inches and a diameter of 17 inches. Plots 240 to 270 in FIG. 2 represent honeycomb ceramic bodies heated at heating rate of 125° C./hr in the second stage. Plots 250 to 270 represent honeycomb ceramic bodies having a 13 inch diameter and a 12 inch length. Plot 240 represents a honeycomb ceramic body having a 12 inch diameter and an 11 inch length. A comparison of identical heating rates in the second stage in FIG. 2 shows that smaller honeycomb ceramic bodies have a lower $\Delta T$ than larger honeycomb ceramic bodies.

Figure 3:
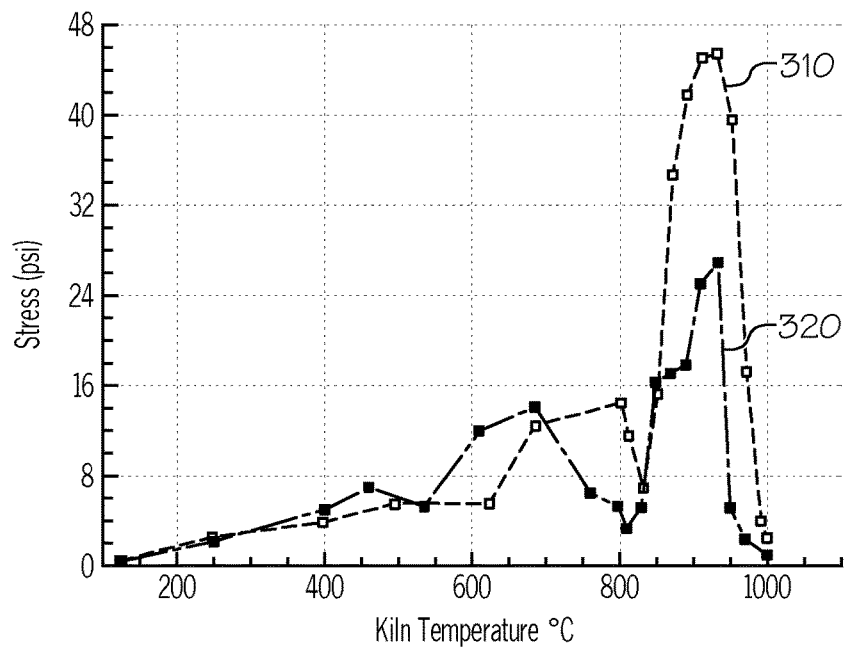
FIG. 3 is a graph showing stresses of two ceramic bodies at various kiln temperatures, one using a firing cycle according to embodiments of the present disclosure, and one using a firing cycle that is not in accordance with embodiments of the present disclosure.

It should be understood that a large ΔT in a honeycomb ceramic body may increase stresses and, thus, increase the likelihood that the honeycomb ceramic body will crack. FIG. 3 shows stresses in honeycomb ceramic bodies as a function of kiln temperature. Plot 310 shows stresses in a honeycomb ceramic body that is not fired according to the method disclosed herein, and plot 320 shows stresses in a honeycomb ceramic body that is fired according an embodiment of the method disclosed herein. As may be seen in a comparison of FIG. 2 and FIG. 3, the high stresses in the honeycomb ceramic body may occur at kiln temperatures where ΔT is at a maximum. However, stresses in the honeycomb ceramic body may not be significantly large in the first stage of the method for firing the honeycomb ceramic body and, thus, high heating rates and thermal gradients may be used in the first stage of the firing method without introducing large amounts of stress which may ultimately crack the body.

Referring now to FIG. 1, an embodiment of the firing method disclosed herein may include a first stage that heats a green honeycomb ceramic body from room temperature to about 400° C. at a heating rate of about 125° C./hr. The size of the honeycomb ceramic body in the embodiment depicted in FIG. 1 does not affect the heating rate in the first stage. Accordingly, large- or small-sized honeycomb ceramic bodies may be heated at the first stage heating rate shown in FIG. 1. It should also be understood that the temperature to which the green honeycomb ceramic body is heated is not particularly limited. In embodiments, the green honeycomb ceramic body may be heated to 250° C., or even to 300° C. In other embodiments, the green honeycomb ceramic body may be heated to 500° C., or even to 550° C. In some other embodiments, the green honeycomb ceramic body may be heated to 600° C., or even to 650° C.

The oxygen level of the atmosphere within the kiln during the first stage may be kept low. Theoretically, using a high heating rate in the first stage may allow higher amounts of oxygen to be present in the first stage of the firing methods described herein compared to conventional firing processes for honeycomb ceramic bodies, because rapid heating of the green honeycomb ceramic body in the first stage, according to embodiments, may not allow oxygen to react with residual elements in the green honeycomb ceramic body before the temperature of the green honeycomb ceramic body reaches temperatures of the second or third stages. In embodiments, the amount of oxygen in the atmosphere of the kiln in the first stage may be about 4% by volume, or even about 6% or less. In some other embodiments, the amount of oxygen in the atmosphere of the kiln in the first stage may be about 8% or less, or even about 10% or less. In some other embodiments, the amount of oxygen in the atmosphere of the kiln in the first stage may be about 12% or less. In still other embodiments, the amount of oxygen in the kiln during the first stage may be about 14% or less, or even about 15% or less. The amount of oxygen in the atmosphere of the kiln in the first stage is generally lower than an amount of oxygen used in a conventional firing processes for honeycomb ceramic bodies.

Oxygen levels in the atmosphere of the kiln may be controlled by any suitable means. In embodiments, the level of oxygen in the atmosphere of the kiln may be modified by injecting oxygen into the kiln. In other embodiments, the level of oxygen in the atmosphere of the kiln may be modified by using different types of setters. For example, in embodiments, the setter may be composed of silicon carbide. In other embodiments, the setter may be composed of the same material as the green honeycomb ceramic body that is being fired. The geometry of the setter may also contribute to the oxygen levels in the atmosphere of the kiln. For example, in embodiments, the setter may be a solid plate having any suitable thickness. In other embodiments, the setter may be a plate having holes formed therein; the holes may be present in any suitable number or any suitable geometry. In yet other embodiments, the setter may be ring shaped. It should be understood that other setter compositions and geometries may be used without deviating from the scope of this disclosure.

Steam may be used in the first stage to broaden the operating window for heating rate and an amount of oxygen in the atmosphere of the kiln. Use of steam in the kiln atmosphere generally prevents cracking by modifying reactions that occur in the green honeycomb ceramic body especially the organic decomposition and carbon removal. Steam may be injected in this stage to modify reactions that enable benefit in the second stage, and beyond. Therefore, steam may be injected into the kiln at any time during any stage to impede cracking. However, steam may be corrosive and, thus, the amount of steam used should be limited in the firing process. As discussed above, if the heating rate in the first stage is sufficiently high, cracking of the honeycomb ceramic body may not occur, even when no steam is introduced into the kiln in the first stage. Therefore, no steam or small quantities of steam may be used in the first stage. In embodiments, the amount of steam introduced into the kiln in the first stage may be from 0% to about 30% by volume or even from about 5% to about 25%. In some other embodiments, the amount of steam introduced into the kiln in the first stage may be from about 10% to about 20% or even from about 12% to about 15%. In various embodiments, no steam may be introduced into the kiln during the first stage.

Second Stage

In embodiments, the second stage of the firing method may include heating the green honeycomb ceramic body from the maximum temperature reached in the first stage to from about 650° C. to about 950° C. or even from about 675° C. to about 925° C. In some embodiments, the second stage of the firing method may include heating the green honeycomb ceramic body from the maximum temperature reached in the first stage to from about 700° C. to about 900° C. or even from about 725° C. to about 875° C. In some other embodiments, the second stage of the firing method may include heating the green honeycomb ceramic body from the maximum temperature reached in the first stage to from about 750° C. to about 850° C. or even from about 775° C. to about 825° C.

The heating rate in the second stage may be such that a rate of change in T is the same or lower than the rate of change in T in the first stage. Accordingly, the heating rate in the second stage may be less than or equal to the heating rate in the first stage. In embodiments, the heating rate in the second stage may be from about 10° C./hr to about 125° C./hr or even from about 20° C./hr to about 100° C./hr. In some embodiments, the heating rate in the second stage may be from about 30° C./hr to about 75° C./hr or even from about 32° C./hr to about 50° C./hr. In some other embodiments, the heating rate in the second stage may be from about 35° C./hr to about 40° C./hr.

The heating rate in the second stage may depend on the size of the honeycomb ceramic body that is being fired. As previously discussed, larger honeycomb ceramic bodies may likely have a larger ΔT, while smaller honeycomb ceramic bodies may likely have a smaller ΔT at an identical heating rate, as shown in FIG. 2. As may be seen in a comparison of FIG. 2 and FIG. 3, the highest stresses in the honeycomb ceramic body may occur at similar kiln temperatures where ΔT is at a maximum. Although stresses and ΔT in the honeycomb ceramic body may be higher in the second stage than in the first stage, stresses and ΔT may not be significantly large in the second stage and, thus, relatively high heating rates may still be used in the second stage of the firing method according to embodiments, particularly when smaller-sized honeycomb ceramic bodies are being fired.

In embodiments, the honeycomb ceramic body may be a cylinder having a diameter of from about 9 inches to about 15 inches. In other embodiments, the honeycomb ceramic body may be a cylinder having a diameter of from about 9 inches to about 12 inches, or even about 11 inches. In some embodiments, the honeycomb ceramic body may be cylindrical having a diameter of about 12 inches and a length of about 11 inches. In some embodiments, the honeycomb ceramic body may have a diameter of about 13 inches and a length of about 12 inches. In some other embodiments, the honeycomb ceramic body may have a diameter of about 13 inches and a length of about 17 inches. In yet other embodiments, the honeycomb ceramic body may have a diameter of about 11 inches and a length of about 6 inches, or even a diameter of about 14 inches and a length of about 9 inches. In still other embodiments, the honeycomb ceramic body may have a diameter from about 3.5 inches to 5.5 inches and a height of about 6 inches. In embodiments, the honeycomb ceramic body may have an aspect ratio of from about 0.50 to about 2.00, or even of from about 0.75 to about 1.50. In other embodiments, the honeycomb ceramic body may have an aspect ratio of from about 1.00 to about 1.25.

The heating rate in the second stage for a honeycomb ceramic body having a diameter of about 12 inches and a length of about 11 inches may be from about 32° C./hr to about 150° C./hr or even from about 40° C./hr to about 120° C./hr. In some embodiments, the heating rate in the second stage for a honeycomb ceramic body having a diameter of about 12 inches and a length of about 11 inches may be from about 50° C./hr to about 125° C./hr or even from about 60° C./hr to about 100° C./hr. In some other embodiments, the heating rate of a 12×11 inch honeycomb ceramic body may be about 32° C./hr, about 50° C./hr, about 75° C./hr, or about 125° C./hr.

The heating rate in the second stage for a honeycomb ceramic body having a diameter of about 13 inches and a length of about 12 inches may be from about 32° C./hr to about 75° C./hr or even from about 40° C./hr to about 65° C./hr. In some embodiments the heating rate in the second stage for a honeycomb ceramic body having a diameter of about 13 inches and a length of about 12 inches may be from about 50° C./hr to about 60° C./hr. In some other embodiments, the heating rate of a 13×12 inch honeycomb ceramic body may be about 32° C./hr, about 50° C./hr, or about 75° C./hr.

The heating rate in the second stage for a honeycomb ceramic body having a diameter of about 13 inches and a length of about 17 inches may be from about 32° C./hr to about 60° C./hr or even from about 40° C./hr to about 55° C./hr. In embodiments, the heating rate of a 13×17 inch honeycomb ceramic body may be about 32° C./hr, or about 50° C./hr.

Referring now to FIG. 1, an embodiment of the firing method disclosed herein may include a second stage that heats a green honeycomb ceramic body from about 400° C. to about 800° C. at a heating rate that varies according to the size of the honeycomb ceramic body that is being fired. In the embodiment depicted in FIG. 1 plot 110 shows that a cylindrical honeycomb ceramic body having a diameter of 12 inches and a length of about 11 inches may be heated at a heating rate of about 125° C./hr in this temperature range without cracking. Plot 120 shows that a cylindrical honeycomb ceramic body having a diameter of 13 inches and a length of about 12 inches, or smaller, may be heated at a heating rate of about 75° C./hr without cracking. Plot 130 shows that a cylindrical honeycomb ceramic body having a diameter of 13 inches and a length of about 17 inches, or smaller, may be heated at a heating rate of about 50° C./hr without inducing cracking of the honeycomb ceramic body. It should be understood that the smaller-sized honeycomb ceramic bodies may also be heated at lower heating rates without inducing cracking. For example, at a heating rate of 50° C./hr honeycomb ceramic bodies that are 12×11, 13×12, and 13×17 inches may be fired without inducing cracking. Further, at a heating rate of 75° C./hr cylindrical honeycomb ceramic bodies that are 12×11 and 13×12 inches may be fired without inducing cracking.

The heating rate in the second stage may be lower than the heating rate in the first stage, and may be decreased in accordance with the size of the honeycomb ceramic body that is being fired. As the heating rate decreases, the amount of oxygen in the system may increase without creating cracks in the honeycomb ceramic body. Accordingly, the amount of oxygen in the atmosphere of the kiln during the second heating stage is not particularly limited, and may be set to ambient conditions. In embodiments, the amount of oxygen in the atmosphere of the kiln during the second stage may be from about 4% to about 15% by volume or even from about 6% to about 13%. In some embodiments, the amount of oxygen in the atmosphere of the kiln during the second stage may be or from about 8% to about 12%.

As discussed above, steam may be introduced in the second stage to reduce cracking that may occur in the honeycomb ceramic body. However, the heating rate in the second stage may be set to a value such that cracking does not occur, even without introducing steam. Therefore, small quantities of steam may be used in the second stage. In embodiments, the amount of steam introduced into the heating kiln during the second stage may be from 0% to about 30% by volume or even from about 5% to about 25%. In some embodiments, the amount of steam introduced into the heating kiln during the second stage may be from about 10% to about 20% or even from about 12% to about 15%. In various embodiments, no steam may be introduced into the kiln during the second stage.

Third Stage

In embodiments, the third stage of the firing method described herein may include heating the green honeycomb ceramic body from the maximum temperature reached in the second stage to a hold temperature. The hold temperature may be greater than or equal to 950° C. or even from about 950° C. to about 1100° C. In embodiments, the hold temperature may be about 1000° C. The heating rate in the third stage may be less than or equal to the heating rate in the first stage. In embodiments, the heating rate in the third stage may be greater than or equal to about 20° C./hr or even from about 20° C./hr to about 90° C./hr. In some embodiments, the heating rate in the third stage may be from about 25° C./hr to about 75° C./hr or even from about 30° C./hr to about 65° C./hr. In some other embodiments, the heating rate in the third stage may be from about 30° C./hr to about 60° C./hr. In embodiments, the heating rate in the third stage may be about 20° C./hr, about 50° C./hr, or even about 75° C./hr.

As may be seen in a comparison of FIG. 2 and FIG. 3, the highest stresses in the honeycomb ceramic body and the highest ΔT may occur within the temperature ranges of the third stage. Thus, in embodiments, heating rates in the third stage may be sufficiently lower than heating rates in the first and second stages to decrease the rate of change in ΔT and, thereby, reduce stresses that may cause cracking of the honeycomb ceramic body.

The size of the honeycomb ceramic body does not necessarily affect the heating rate in the third stage, thus all sizes of honeycomb ceramic bodies may be heated at the same heating rate during the third stage. However, the heating rate in the third stage may be lower for larger honeycomb ceramic bodies than for smaller honeycomb ceramic bodies to decrease a rate of change in ΔT, which, as discussed above, may be larger for large honeycomb ceramic bodies. For example, the heating rate in the third stage when firing a cylindrical honeycomb ceramic body with a diameter of about 12 inches and a length of about 11 inches may be higher than a heating rate in the third stage when firing a cylindrical honeycomb ceramic body with a diameter of about 13 inches and a length of about 17 inches.

Referring now to FIG. 1, in the depicted embodiment, the heating rate in the third stage, as represented by a similar slope in plots 110 to 130 from 800° C. to 1000° C., may be identical for all three sizes of honeycomb ceramic bodies. Additionally, the heating rate in the third stage may be lower than the lowest heating rate in the second stage (i.e., lower than 50° C./hr), or about 20° C./hr. This lower heating rate may decrease ΔT in a stage where ΔT and stresses are at their highest, as shown in FIG. 2, thus reducing stresses in the honeycomb ceramic body that may cause cracking.

The heating rate in the third stage may be such (i.e., at or below the heating rate in the first stage) that, as with the second stage, oxygen levels in the atmosphere of the kiln in the third stage are not particularly limited and may be at ambient levels. Accordingly, in embodiments, the amount of oxygen in the atmosphere of the kiln during the third stage may be from about 5% to about 13% by volume, such as from about 8% to about 12%.

Steam may be introduced in the third stage to reduce cracking that may occur in the honeycomb ceramic body. Although steam is not required in the third stage to eliminate cracking of the honeycomb ceramic body. In embodiments, the amount of steam introduced into the kiln during the third stage may be from 0% to about 45% by volume, such as from about 15% to about 45%, or even from about 20% to about 40%. In some other embodiments, the amount of steam introduced into the kiln during the third stage may be from about 25% to about 30%.

Fourth Stage

In embodiments, the fourth stage of the firing method may be an isothermal hold for a time sufficient to remove any residual carbon. The temperature of the isothermal hold may be greater than about 950° C. or even greater than about 1000° C. In some embodiments, the temperature of the isothermal hold may be greater than about 1050° C. or even greater than about 1100° C. In some other embodiments, the temperature of the isothermal hold may be greater than about 1150° C. According to embodiments, the maximum temperature for this stage, which may be an isothermal carbon burn, may be 1150° C. The duration of the isothermal hold is not particularly limited and may be as long as required to remove residual carbon to acceptable levels. However, in embodiments, the duration of the isothermal hold may be less than about 20 hours or even less than about 17 hours. In some embodiments, the duration of the isothermal hold may be less than about 15 hours or even less than about 12 hours. In some other embodiments, the duration of the isothermal hold may be less than about 10 hours. In other embodiments, an isothermal hold is not required.

The fourth stage may be used to remove residual carbon from the green honeycomb ceramic body. The amount of oxygen in the atmosphere of the kiln in the fourth stage may be maintained at high levels relative to the first, second, and third stages. Increased amounts of oxygen may promote reactions that may promote removal of residual carbon from the green honeycomb ceramic body. Accordingly, in embodiments, the amount of oxygen present in the atmosphere of the kiln during the fourth stage may be from about 7% to about 12% by volume, such as from about 8% to about 10%.

The size of the honeycomb ceramic body may not necessarily affect the temperature of the isothermal hold in the fourth stage. However, the duration of the isothermal hold may be longer for large honeycomb ceramic bodies than for small honeycomb ceramic bodies. One reason for a prolonged isothermal hold for large honeycomb ceramic bodies may be that it may take longer for residual carbon deep within a large honeycomb ceramic body to react than the time required for carbon within a small honeycomb ceramic body to react. In embodiments, the isothermal hold may be complete when the difference in temperature between the core and the skin delta returns to a differential of <10° C. At this point the isothermal hold may be considered complete that the residual carbon has been removed and, thus, the isothermal hold may be concluded at this point.

As discussed above, steam may be used to prevent cracking of the honeycomb ceramic body in the fourth stage. In embodiments, an amount of steam used in the fourth stage may be from about 0% to about 30% by volume, such as from about 5% to about 25%, from about 10% to about 20%, or from about 12% to about 15%.

Figure 4:
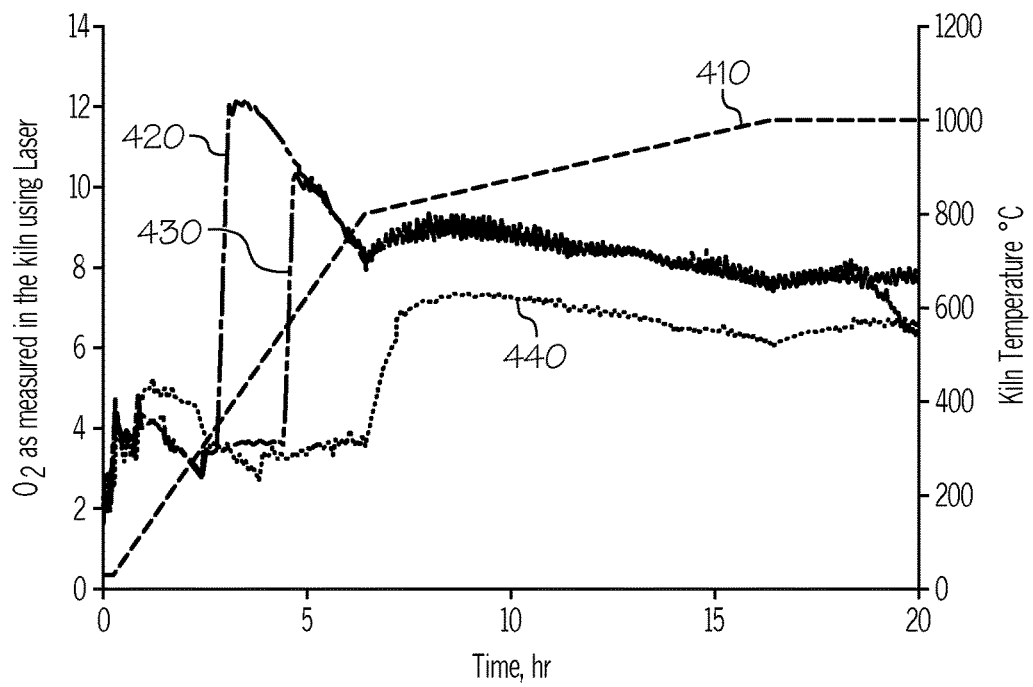
FIG. 4 is a graph showing affects of the presence of oxygen on cracking during firing cycles.

Referring now to FIG. 4, modification of oxygen levels in the kiln may affect cracking of the honeycomb ceramic body. Plot 410 in FIG. 4 shows the heating rate in various stages of the firing cycle. In FIG. 4 the heating rates are: 125° C./hr in the first stage; 125° C./hr in the second stage; 30° C./hr in the third stage; and an isothermal hold at 1000° C. in the fourth stage that may allow complete carbon burnout. In the examples depicted in FIG. 4, the heating rate in the second stage is the same as the heating rate in the first stage, and the heating rate in the third stage is lower than the heating rate in the first and second stages. As shown in FIG. 4, three oxygen levels are introduced. In a first embodiment shown in plot 420, more than 12% oxygen by volume is introduced into the kiln late in the first stage of the firing method and the volume of oxygen is allowed to decrease through the second stage. In a second embodiment shown in plot 430, about 10% oxygen is introduced into the kiln in the middle of the second stage and the volume of oxygen is allowed to decrease through the remainder of the second stage. In a third embodiment shown in plot 440, about 7% oxygen is introduced into the kiln during the third stage. The first example yielded cracking in 1 of 5 honeycomb ceramic bodies. The second example yielded cracking in 2 of 5 honeycomb ceramic bodies. The third example yielded cracking in 4 of 5 honeycomb ceramic bodies. Thus, the examples depicted in FIG. 4 show that introducing larger amounts of oxygen into the kiln in the earlier stages of the firing methods disclosed herein—where the heating rates are at their highest—may reduce cracking of the honeycomb ceramic body. This is contrary to conventional firing processes, which use low amounts of oxygen and/or low heating rates to reduce cracking of the honeycomb ceramic body.

Figure 5:
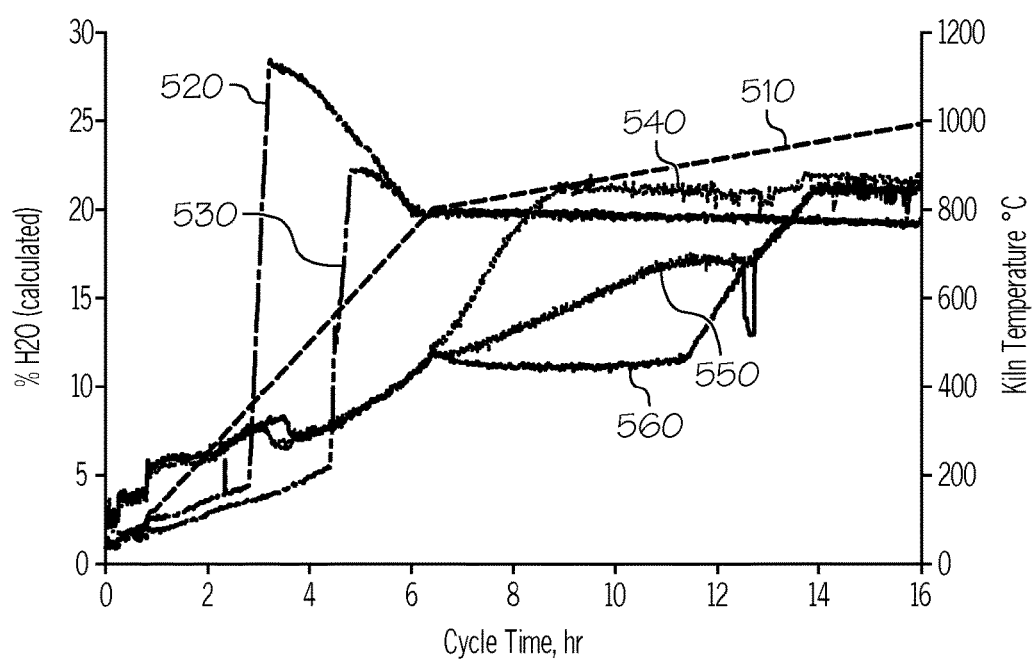
FIG. 5 is a graph showing affects of the presence of steam on cracking during firing cycles.

Referring now to FIG. 5, modification of steam levels in the kiln may also affect cracking of the honeycomb ceramic body. Plot 510 in FIG. 5 shows the heating rate in various stages of the firing cycle. In FIG. 5, the heating rates are: 125° C./hr in the first stage; 125° C./hr in the second stage; 30° C./hr in the third stage, and an isothermal hold at 1000° C. in the fourth stage that may allow for complete carbon burnout. In the examples depicted in FIG. 5, the heating rate in the second stage is the same as the heating rate in the first stage, and the heating rate in the third stage is significantly lower than the heating rate in the first and second stages. As shown in FIG. 5, five steam levels are introduced. In a first example shown in plot 520, nearly 30% steam by volume is introduced into the firing process late in first stage and the amount of steam is allowed to decrease through the second stage. In a second example shown in plot 530, about 22% steam by volume is introduced into the kiln in the middle of the second stage and the amount of steam is allowed to decrease through the remainder of the second stage. In a third example shown in plot 540, steam is introduced into the kiln throughout the second stage and reaches a maximum of about 21% by volume early in the third stage, where the amount of steam levels off. In a fourth embodiment shown in plot 550, steam is introduced into the kiln throughout the second stage and reaches a maximum of about 16% by volume in the middle of the third stage, where the amount of steam levels off. In a fifth embodiment shown in plot 560, steam is introduced into the kiln throughout the second stage and the amount of steam is elevated in the middle of the third stage to a maximum of about 22% by volume, where the amount of steam levels off. The first, second, and third examples resulted in no cracking in all five honeycomb ceramic bodies. However, the fourth example resulted in cracking in 2 of 5 honeycomb ceramic bodies, and the fifth example resulted in cracking in 5 of 5 honeycomb ceramic bodies. Thus, FIG. 5 shows that introducing large quantities of steam before the largest temperature difference between the surface of the honeycomb ceramic body and the core of the honeycomb ceramic body occurs, or where the largest temperature difference between the surface of the honeycomb ceramic body and the core of the honeycomb ceramic body occurs, may reduce cracking of the honeycomb ceramic body.

For the purposes of describing and defining the embodiments herein, it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

EXAMPLES

Embodiments will be further clarified by the following examples.

Comparative Examples 1-6

In the comparative examples below, cylindrical honeycomb ceramic bodies having diameters of 13 inches and lengths of 12 or 17 inches were heated in a kiln with heating rates as indicated in Table 1. The heating rate from room temperature to 400° C. for each green honeycomb ceramic body was 125° C./hr. The amount of oxygen present in the atmosphere of the kiln during each stage is shown in Table 1.

TABLE 1

| Comparative Example | Crack levels 13 × 12 (n) | Crack levels 13 × 17 (n) | 400-800° C. Heating Rate (° C./hr) | 800-1000° C. Heating Rate (° C./hr) | 400-800° C. $O_2$ SP# (%) | 800-1000° C. $O_2$ SP# (%) |
|---|---|---|---|---|---|---|
| 1 | 20% (5) |  | 125 | 20 | 21 | 21 |
| 2 | 60% (5) |  | 125 | 20 | 12.5* | 21 |
| 3 | 100% (5) |  | 125 | 20 | 4 | 21 |
| 4 | 100% (5) |  | 125 | 125 | 8 | 16.75* |
| 5 |  | 100% (5) | 75 | 20 | 21 | 21 |
| 6 |  | 100% (3) | 125 | 125 | 8 | 16.75* |

*$O_2$ levels increased from 4 to 21 within the range, numbers are time averaged set points
Actual kiln values do not reach set point (SP). Max kiln $O_2$ levels for 400-800° C. is 10.8%, while max kiln $O_2$ levels for 800-1000° C. is 8.8%

As shown in Table 1, when the heating rate in the temperature range from 400° C. to 800° C. is 125° C./hr, significant cracking occurs in both the 13×12 inch honeycomb ceramic body and the 13×17 inch honeycomb ceramic body, regardless of the oxygen level in that temperature range or the heating rate in the temperature range from 800° C. to 1000° C. Thus, Comparative Examples 1-6 show that maintaining a heating rate of 125° C./hr for large honeycomb ceramic bodies (e.g., 13×12 and 13×17 cylindrical honeycomb ceramic bodies) in a temperature range from 400° C. to 800° C. results in cracking of the honeycomb ceramic body.

Examples 1-7

In the examples below, cylindrical honeycomb ceramic bodies having diameters of 13 inches and lengths of 12 or 17 inches are heated in a kiln with heating rates as indicated in Table 2. The heating rate from room temperature to 400° C. for each green honeycomb ceramic body was 125° C./hr. The amount of oxygen that was present in the atmosphere of the kiln is shown in Table 2.

TABLE 2

| Example | Crack levels 13 × 12 (n) | Crack levels 13 × 17 (n) | 400-800° C. Heating Rate (° C./hr) | 800-1000° C. Heating Rate (° C./hr) | 400-800° C. O$_2$ SP[#] (%) | 800-1000° C. O$_2$ SP[#] (%) |
|---|---|---|---|---|---|---|
| 1 | 0% (5) | | 75 | 20 | 21 | 21 |
| 2 | 0% (5) | | 75 | 20 | 21 | 21 |
| 3 | 0% (5) | | 32 | 75 | 21 | 21 |
| 4 | 0% (5) | | 75 | 20 | 8 | 6 |
| 5 | | 0% (5) | 50 | 20 | 21 | 21 |
| 6 | 0% (5) | | 50 | 20 | 21 | 21 |
| 7 | 0% (5) | | 32 | 75 | 21 | 21 |

[#]Actual kiln values do not reach set point (SP). Max kiln O$_2$ levels for 400-800° C. is 10.8%, while max kiln O$_2$ levels for 800-1000° C. is 8.8%

As shown in Table 2, when heating rates of the honeycomb ceramic bodies in the temperature range of 400° C. to 800° C. were at or below 75° C./hr, and the heating rates in the temperature range of 800° C. to 1000° C. were at or below 75° C./hr, cracking is avoided, even when high oxygen levels are present in the atmosphere of the kiln.

Comparative Examples 7-11

In the comparative examples below, cylindrical honeycomb ceramic bodies having diameters of 13 inches and lengths of 12 or 17 inches were heated in a kiln with heating rates as indicated in Table 3. The heating rate from room temperature to 400° C. for each honeycomb ceramic body was 125° C./hr. The amount of oxygen present in the atmosphere of the kiln is shown in Table 3. Comparative Examples 7, 10, and 11 used 30% steam by volume in the atmosphere of the kiln from 200° C. to 1000° C. Comparative Example 8 used no steam up to 850° C. and 30% steam by volume in the atmosphere of the kiln from 850° C. to 1000° C. Comparative Example 9 used no steam up to 900° C. and 30% steam by volume in the atmosphere of the kiln from 900° C. to 1000° C.

TABLE 3

| Comparative Example | Crack levels 13 × 12 (n) | Crack levels 13 × 17 (n) | 400-800° C. Heating Rate (° C./hr) | 800-1000° C. Heating Rate (° C./hr) | 400-800° C. O$_2$ SP[#] (%) | 800-1000° C. O$_2$ SP[#] (%) |
|---|---|---|---|---|---|---|
| 7 | | 66%% (3) | 125 | 20 | 8 | 8 |
| 8[1] | 40% (5) | | 125 | 20 | 4 | 4 |
| 9[2] | 100% (5) | | 125 | 20 | 4 | 4 |
| 10 | | 80% (5) | 75 | 20 | 21 | 21 |
| 11 | 80% | | 125 | 125 | 21 | 21 |

[#]Actual kiln values do not reach set point (SP). Max kiln O$_2$ levels for 400-800° C. is 10.8%, while max kiln O$_2$ levels for 800-1000° C. is 8.8%
[1]No steam from room temperature to 850° C., 30 vol % steam from 850-1000° C.
[2]No steam from room temperature to 900° C., 30 vol % steam from 900-1000° C.

The results in Table 3 show that using high amounts of steam in a process where a high heating rate is used in the temperature range of from 400° C. to 800° C. does not prevent cracking of large honeycomb ceramic bodies. Cracking even occurred when a low heating rate is used in the temperature range of from 800° C. to 1000° C. and with varying amounts of oxygen present in the atmosphere of the kiln during the stages.

Examples 8-12

In the examples below, cylindrical honeycomb ceramic bodies having diameters of 13 inches and lengths of 12 or 17 inches were heated in a kiln with heating rates as indicated in Table 4. The heating rate from room temperature to 400° C. for each green honeycomb ceramic body was 125° C./hr. The amount of oxygen present in the atmosphere of the kiln is shown in Table 4. Examples 10 and 12 use 30% steam by volume in the atmosphere of the kiln from 200° C. to 1000° C. Examples 8 and 9 used no steam up to 350° C. and 30% steam by volume in the atmosphere of the kiln at temperatures from 350° C. to 1000° C. Example 11 used no steam up to 800° C. and 30% steam by volume in the atmosphere of the kiln at temperatures from 800° C. to 1000° C.

TABLE 4

| Example | Crack levels 13 × 12 (n) | Crack levels 13 × 17 (n) | 400-800° C. Heating Rate (° C./hr) | 800-1000° C. Heating Rate (° C./hr) | 400-800° C. O$_2$ SP[#] (%) | 800-1000° C. O$_2$ SP[#] (%) |
|---|---|---|---|---|---|---|
| 8[1] | | 0% (3) | 125 | 20 | 4 | 4 |
| 9[1] | 0% (5) | | 125 | 20 | 4 | 4 |
| 10 | 0% (5) | | 125 | 20 | 4 | 4 |

TABLE 4-continued

| Example | Crack levels 13 × 12 (n) | Crack levels 13 × 17 (n) | 400-800° C. Heating Rate (° C./hr) | 800-1000° C. Heating Rate (° C./hr) | 400-800° C. O$_2$ SP# (%) | 800-1000° C. O$_2$ SP# (%) |
|---|---|---|---|---|---|---|
| 11[2] | 0% (5) | | 125 | 20 | 4 | 4 |
| 12 | 0% (5) | | 125 | 20 | 4 | 4 |

Actual kiln values do not reach set point (SP). Max kiln O$_2$ levels for 400-800° C. is 10.8%, while max kiln O$_2$ levels for 800-1000° C. is 8.8%
[1]No steam from room temperature to 350° C., 30 vol % steam from 350-1000° C.
[2]No steam from room temperature to 800° C., 30 vol % steam from 800-1000° C.

The results in Table 4 show that using high amounts of steam in processes according to embodiments of this disclosure may further reduce cracking of honeycomb ceramic bodies when higher heating rates are used.

It will be apparent to those skilled in the art that various modifications and variations may be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for firing a green honeycomb ceramic body in a kiln, the method comprising:
    a) heating the green honeycomb ceramic body from room temperature to a first temperature that is from about 250° C. to about 650° C. at a first heating rate that is from about 75° C./hr to about 125° C./hr; then
    b) heating the green honeycomb ceramic body to a second temperature that is from about 650° C. to about 950° C. at a second heating rate that is less than or equal to the first heating rate; and
    c) heating the green honeycomb ceramic body to a third temperature that is greater than the second temperature at a third heating rate that is less than or equal to the first heating rate,
    wherein the green honeycomb ceramic body has a diameter of from about 9 inches to about 15 inches, and an aspect ratio of from about 0.50 to about 2.00.

2. The method of claim 1, wherein the first heating rate is about 125° C./hr.

3. The method of claim 1, wherein the first heating rate is about 75° C./hr.

4. The method of claim 1, wherein the second heating rate is from about 10° C./hr to about 125° C./hr.

5. The method of claim 4, wherein the third heating rate is from about 20° C./hr to about 100° C./hr.

6. The method of claim 1, wherein the third heating rate is from about 20° C./hr to about 90° C./hr.

7. The method of claim 1, further comprising:
    d) holding the green honeycomb ceramic body at a hold temperature to remove residual carbon, wherein the green honeycomb ceramic body is held at the hold temperature for up to about 20 hours.

8. The method of claim 1 further comprising adjusting an oxygen level in step a) and step b) to be from about 4% to about 15% by volume of an atmosphere in the kiln.

9. The method of claim 1 further comprising adjusting an oxygen level in step c) to be from about 5% to about 13% by volume of an atmosphere in the kiln.

10. The method of claim 1, wherein the oxygen level in step b) and step c) is higher than an oxygen level in step a).

11. The method of claim 1, wherein the green honeycomb ceramic body has a diameter greater than about 12 inches.

12. The method of claim 1, wherein the green honeycomb ceramic body is cylindrical and has a diameter of about 12 inches and a length of about 11 inches, and wherein the second heating rate is from about 50° C./hr to about 125° C./hr.

13. The method of claim 1, wherein the green honeycomb ceramic body is cylindrical and has a diameter of about 13 inches and a length of about 12 inches, and wherein the second heating rate is from about 30° C./hr to about 75° C./hr.

14. The method of claim 1, wherein the green honeycomb ceramic body is cylindrical and has a diameter of about 13 inches and a length of about 17 inches, and wherein the second heating rate is from about 30° C./hr to about 60° C./hr.

15. The method of claim 1 further comprising introducing steam into the kiln in steps a) through c), wherein an amount of steam is present during steps a) through c) at no more than about 30% by volume of an atmosphere in the kiln.

16. The method of claim 1, wherein the green honeycomb ceramic body has a super addition organic load from about 5% by weight to about 50% by weight.

17. The method of claim 16, wherein the green honeycomb ceramic body has a super addition organic load from about 25% by weight to about 50% by weight.

18. The method of claim 1, wherein the green honeycomb ceramic body comprises one or more of talc, clay and graphite, wherein the talc comprises about 15% by weight to about 50% by weight, the clay comprises about 10% by weight to about 30% by weight, and the graphite comprises up to about 20% as a super-addition.

19. The method of claim 1, wherein a cordierite honeycomb ceramic body is formed, the cordierite honeycomb ceramic body having a porosity of greater than about 55%.

20. The method of claim 1, wherein a cordierite honeycomb ceramic body is formed, the cordierite honeycomb ceramic body having a porosity of from about 40% to about 60%.

21. A method for firing a green honeycomb ceramic body in a kiln, the method comprising:
    a) heating the green honeycomb ceramic body from room temperature to a first temperature of from about 375° C. to about 500° C. at a first heating rate that is from about 90° C./hr to about 125° C./hr;
    b) heating the green honeycomb ceramic body to a second temperature of from about 750° C. to about 850° C. at a second heating rate that is from about 20° C./hr to about 75° C./hr;
    c) heating the green honeycomb ceramic body to a third temperature of from about 950° C. to about 1100° C. at a third heating rate that is less than or equal to the second heating rate; and
    d) holding the green honeycomb ceramic body at a hold temperature to remove residual carbon, wherein the green honeycomb ceramic body has a diameter of from about 9 inches to about 15 inches, and an aspect ratio of from about 0.75 to about 1.50.

22. The method of claim 21, wherein the green honeycomb ceramic body is cylindrical and has a diameter of about 12 inches and a length of about 11 inches.

23. The method of claim 21, wherein the green honeycomb ceramic body is cylindrical and has a diameter of about 13 inches and a length of about 12 inches, and wherein the second heating rate is from about 32° C./hr to about 75° C./hr.

24. The method claim 21, wherein the green honeycomb ceramic body is cylindrical and has a diameter of about 13 inches and a length of about 17 inches, and wherein the second heating rate is about 50° C./hr.

25. The method of claim 21, wherein the third heating rate is from about 20° C./hr to about 50° C./hr.

26. The method of claim 21 further comprising adjusting an oxygen level in step a) from about 4% to about 15% by volume of an atmosphere in the kiln.

27. The method of claim 21 further comprising adjusting an oxygen level in step b) and step c) to be from about 6% to about 15% by volume of an atmosphere in the kiln.

28. The method of claim 21 further comprising adjusting an oxygen level in step d) to be from about 7% to about 12% by volume of an atmosphere in the kiln.

29. The method of claim 21 further comprising introducing steam into the kiln in steps a) through c), wherein an amount of steam is present during steps a) through c) up to about 30% of an atmosphere in the kiln.

30. The method of claim 21 further comprising introducing steam into the kiln in step d), wherein an amount of steam is present during step d) from about 15% to about 45% of an atmosphere in the kiln.

31. The method of claim 1 wherein an oxygen level in step a) and step b) is from about 4% to about 15% by volume of an atmosphere in the kiln.

32. The method of claim 1 wherein an oxygen level in step c) is from about 5% to about 13% by volume of an atmosphere in the kiln.

33. The method of claim 21 wherein the oxygen level in step a) is from about 4% to about 15% by volume of an atmosphere in the kiln.

34. The method of claim 21 wherein the oxygen level in step b) and step c) is from about 6% to about 15% by volume of an atmosphere in the kiln.

35. The method of claim 21 wherein the oxygen level in step d) is from about 7% to about 12% by volume of an atmosphere in the kiln.

* * * * *

UNITED STATES PATENT AND TRADEMARK OFFICE
CERTIFICATE OF CORRECTION

PATENT NO.        : 10,000,424 B2
APPLICATION NO.   : 14/196163
DATED             : June 19, 2018
INVENTOR(S)       : Douglas Munroe Beall et al.

It is certified that error appears in the above-identified patent and that said Letters Patent is hereby corrected as shown below:

In the Claims

In Column 17, Line 11, Claim 24, delete "method claim" and insert -- method of claim --, therefor.

Signed and Sealed this
Fifth Day of November, 2019

Andrei Iancu
*Director of the United States Patent and Trademark Office*